United States Patent
Cassereau

[11] Patent Number: 5,301,020
[45] Date of Patent: Apr. 5, 1994

[54] METHOD AND APPARATUS FOR CODING MOTION PICTURES UTILIZING MOTION COMPENSATION

[75] Inventor: Philippe M. Cassereau, San Mateo, Calif.

[73] Assignee: Aware, Inc., Cambridge, Mass.

[21] Appl. No.: 16,786

[22] Filed: Feb. 11, 1993

Related U.S. Application Data

[63] Continuation-in-part of Ser. No. 786,722, Nov. 1, 1991.

[51] Int. Cl.⁵ ..................... H04N 7/133; H04N 7/137
[52] U.S. Cl. ..................................... 368/415; 348/409
[58] Field of Search ................ 358/13, 133, 135, 136; H04N 7/133, 7/137

[56] References Cited

U.S. PATENT DOCUMENTS

| | | |
|---|---|---|
| 4,268,861 | 5/1981 | Schreiber et al. . |
| 4,663,660 | 5/1987 | Fedele et al. . |
| 4,751,742 | 6/1988 | Meeker . |
| 4,785,349 | 11/1988 | Keith et al. . |
| 4,817,182 | 3/1989 | Adelson et al. . |
| 4,827,336 | 5/1989 | Acampora et al. . |
| 4,864,398 | 9/1989 | Avis et al. . |
| 4,969,040 | 11/1990 | Gharvi ........................... 358/135 |
| 4,979,041 | 12/1990 | Schreiber . |
| 4,987,480 | 1/1991 | Lippman et al. . |
| 5,014,134 | 5/1991 | Lawton et al. . |
| 5,068,911 | 11/1991 | Resnikoff et al. . |
| 5,121,191 | 6/1992 | Cassereau et al. .............. 358/133 |
| 5,128,757 | 7/1992 | Citta et al. . |
| 5,134,464 | 7/1992 | Basile et al. . |
| 5,136,374 | 8/1992 | Jayant et al. . |
| 5,214,502 | 5/1993 | Stone ................................ 358/13 |

Primary Examiner—Howard W. Britton
Attorney, Agent, or Firm—McCubbrey, Bartels & Ward

[57] ABSTRACT

An improved motion picture coding scheme is described which provides the benefits of both sub-band coding and motion compensation thereby providing greater degrees of compression than would be obtained using either of these techniques separately. The system generates high and low frequency frames from each pair of frames in the original motion picture. The high frequency represents the difference between the first and second frames of the motion picture. The pixels of the low frequency frame are either the average of two corresponding pixels, one from each of the original frames, or a value derived from a single pixel in the first frame. In the later case, the derived value is chosen to minimize artifacts that could hamper further compression of the low-frequency frame based on sub-band coding.

6 Claims, 6 Drawing Sheets

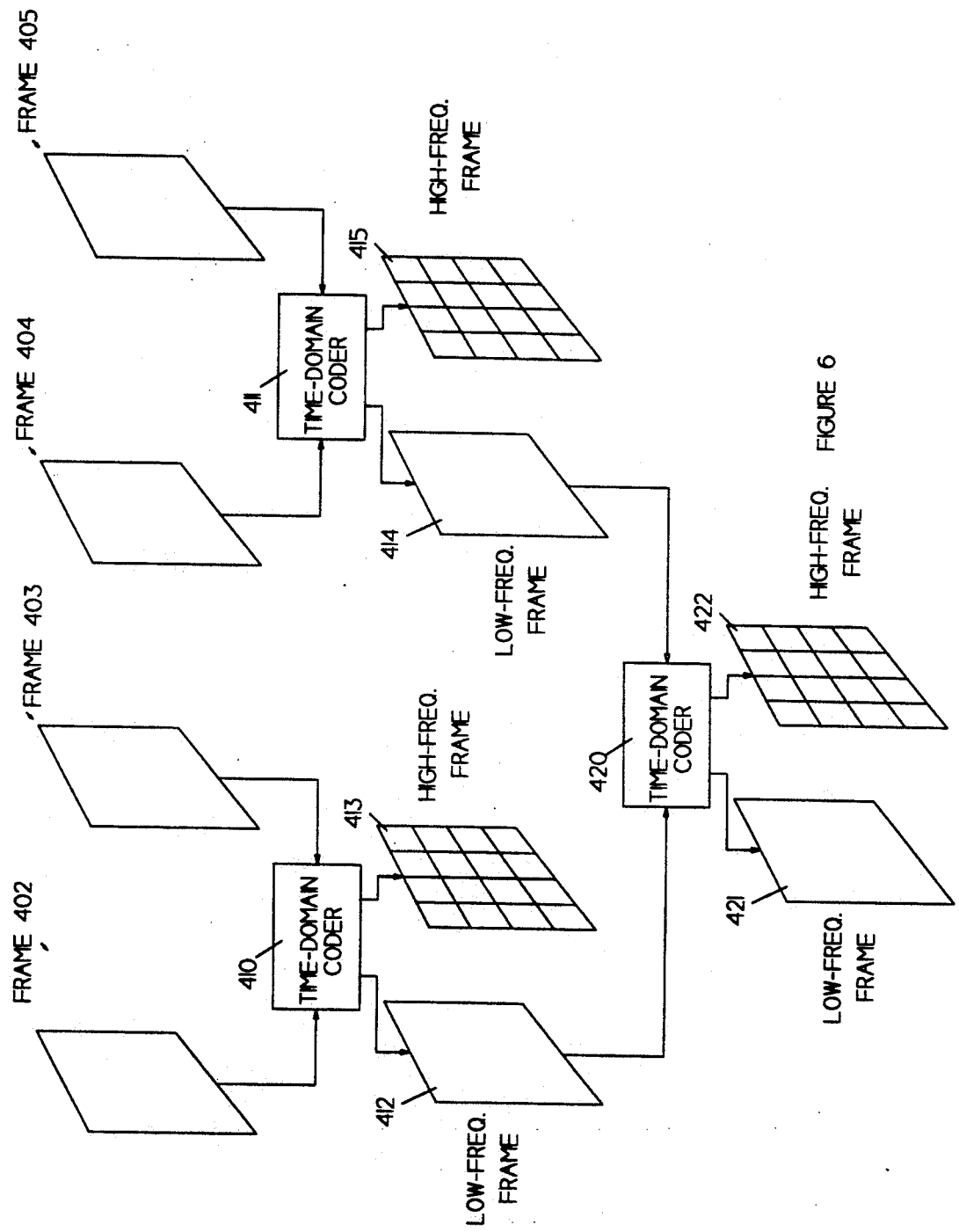

METHOD AND APPARATUS FOR CODING MOTION PICTURES UTILIZING MOTION COMPENSATION

FIELD OF THE INVENTION

This application is a continuation-in-part of U.S. application Ser. No. 07/786,722, filed Nov. 1, 1991.

The present invention relates to methods and apparatuses for reducing to the amount of data needed to represent an image, and more particularly, to a novel method and apparatus for coding motion pictures to enable the motion pictures to be represented by few bits.

BACKGROUND OF THE INVENTION

Images are conventionally represented by a two-dimensional array of values in which each value represents a property of the image at a corresponding point on the image. In the case of gray-scale images, a single number representing the gradations of intensity from white to black, referred to as the gray scale, is stored. In the case of color images, each "value" is a vector whose components represent the gradations in intensity of the various primary colors, or some alternative color code, at the corresponding point in the image. A motion picture comprises a sequence of such images. Typically, thirty or more images are needed for each second of viewing time.

This representation of a motion picture corresponds to the output of a typical image-sensing device such as a television camera. Such a representation is convenient in that it is easily regenerated on a display device such as a CRT tube. However, the number of bits needed to represent the data is prohibitively large for many applications. A single 512×512 gray-scale image with 256 gray levels requires in excess of 256,000 bytes. At 30 frames per second, a communication channel with a bandwidth of approximately 64 million bits per second is needed to transmit the motion picture. A frill color 24 bit per pixel motion picture would require a bandwidth of more than 190 million bits per second.

This bandwidth is significantly greater than that available for many communications purposes. For example, high quality consumer telephone lines are typically limited to 64 thousand bits per second. Hence, commercially viable picture telephone systems would require some form of image compression.

Image compression systems used in motion picture compression applications make use of the redundancy between frames to reduce the amount of information that must be transmitted over the bandwidth-limited communication link. For example, many scenes in a motion picture include portions that are constant from frame to frame for several seconds, if not minutes. Prior art compression schemes attempt to divide the scene into the constant portion and the portion that changes from frame to frame.

The constant portion need be sent only once. Hence, if the constant portion comprises a significant fraction of the scene, considerable image compression can be realized. For example, if the entire scene were constant for 10 seconds, the information needed to reproduce the scene would be contained in one frame of the sequence and an indication of the number of times the frame is to be repeated. This would be approximately 1/300 of the information needed if the scene were sent without compression.

To better understand the manner in which this type of prior art image compression operates, consider a motion picture which is being sent over a bandwidth-limited communication link from a transmitter to a receiver. The receiver will be assumed to have a frame buffer which stores one frame of the motion picture. The contents of this frame are then displayed at the receiver. Ideally, the frame in the receiver will exactly match the corresponding frame at the transmitter.

Typically, the process is started by sending one complete frame of the sequence. This frame is referred to as the key frame. After the key frame is sent, successive frames are specified by sending information specifying changes that have occurred relative to the last frame displayed by the receiver. Typically, the difference between the current frame and the last frame is computed to generate an "incremental frame". If the pixels of the incremental frame are added to those of the key frame, the current frame is regenerated. Since most scenes change slowly, the incremental frames on average have much less information than a key frame; hence the incremental frames require less bandwidth to transmit than a key frame.

As the difference between the key frame and the succeeding frames increases, the incremental frame pixels increase in magnitude and the bandwidth required to send an incremental frame exceeds that of the communication channel. At this point, either a new key frame must be sent or only a portion of the incremental frame may be sent. In general, incremental coding schemes have not provided sufficient compression to allow motion pictures of the quality of commercial television to be sent over low-cost communication channels. Hence, further compression of the motion picture is typically required.

One method for reducing the amount of information that must be sent is to further code the key frame and successive incremental frames using sub-band coding techniques such as those used to compress two-dimensional still images. In these systems, each frame is filtered to generate a plurality of component images therefrom. The filtering process concentrates the information in the frame into one or more of the component images thereby reducing the number of bits that must be used to send the other component images. The degree of compression obtained using these techniques depends on the amount of spatially redundant information in the frames being compressed. Such schemes work well with the key frame, as this frame is a single two-dimensional image, and the schemes in question have been optimized for such images.

The degree to which the incremental frames may be compressed depends on the statistical distribution of the pixels in the frames. As the variance of this distribution increases, the bandwidth needed to transmit the frames increases. Hence, it would be advantageous to provide systems in which the variance of the pixel values in the frames is reduced.

Broadly, it is an object of the present invention to provide an improved apparatus and method for coding motion pictures.

It is a further object of the present invention to provide a method and apparatus in which the variances of the pixel distributions in the key frames and incremental frames is reduced relative to prior art systems.

These and other objects of the present invention will become apparent to those skilled in the art from the following detailed description of the invention and the accompanying drawings.

SUMMARY OF THE INVENTION

The present invention comprises an apparatus and method for generating high and low-frequency component images from first and second frames of a motion picture. The component images are better suited for coding in a limited number of bits than the original two frames; hence, the invention provides an improved system for compressing motion picture sequences. An apparatus according to the present invention includes first and second buffers for storing the frames of the motion picture. The buffers preferably store two-dimensional arrays of pixel values specifying the intensity values at the corresponding points in the motion picture frames. The second buffer is divided into a plurality of regions. Each region is matched to a corresponding region in the first buffer. Hence, there is a correspondence established between each location in said second buffer and a location in said first buffer. However, the number of times a location in the first buffer is matched to a location in the second buffer may differ from one. The invention includes a means for assigning one of two values to each pixel value in the first buffer. The first value is assigned if said pixel was included in a region matched to one and only one of said regions in said second buffer by the matching process and otherwise to the second value. The invention also includes low-frequency and high-frequency buffers for storing the pixels of representing the intensity values of the low-frequency and high-frequency component images. The low-frequency buffer includes one location corresponding to each pixel value in the first buffer. Initially, the low-frequency buffer is caused to store a value related to the pixel value stored in said first buffer at each location corresponding to a pixel in the first buffer array that was assigned the second value. The invention generates the remaining pixel values in said low and high-frequency buffers utilizing a filter.%hat combines each pixel in said second buffer with the corresponding pixel in said first buffer to generate high and low-frequency pixels. The high-frequency pixel is stored in the high-frequency buffer in the location corresponding to the pixel in the second buffer and the low-frequency pixel is stored in the low-frequency buffer in the location corresponding to the pixel in the first buffer if the first value was assigned to said corresponding pixel in the first buffer.

BRIEF DESCRIPTION OF THE DRAWINGS

FIG. 6 illustrates the manner in which a compression apparatus according to the present invention may be iteratively applied to provide higher degrees of compression.

DETAILED DESCRIPTION OF THE INVENTION

Figure 1:
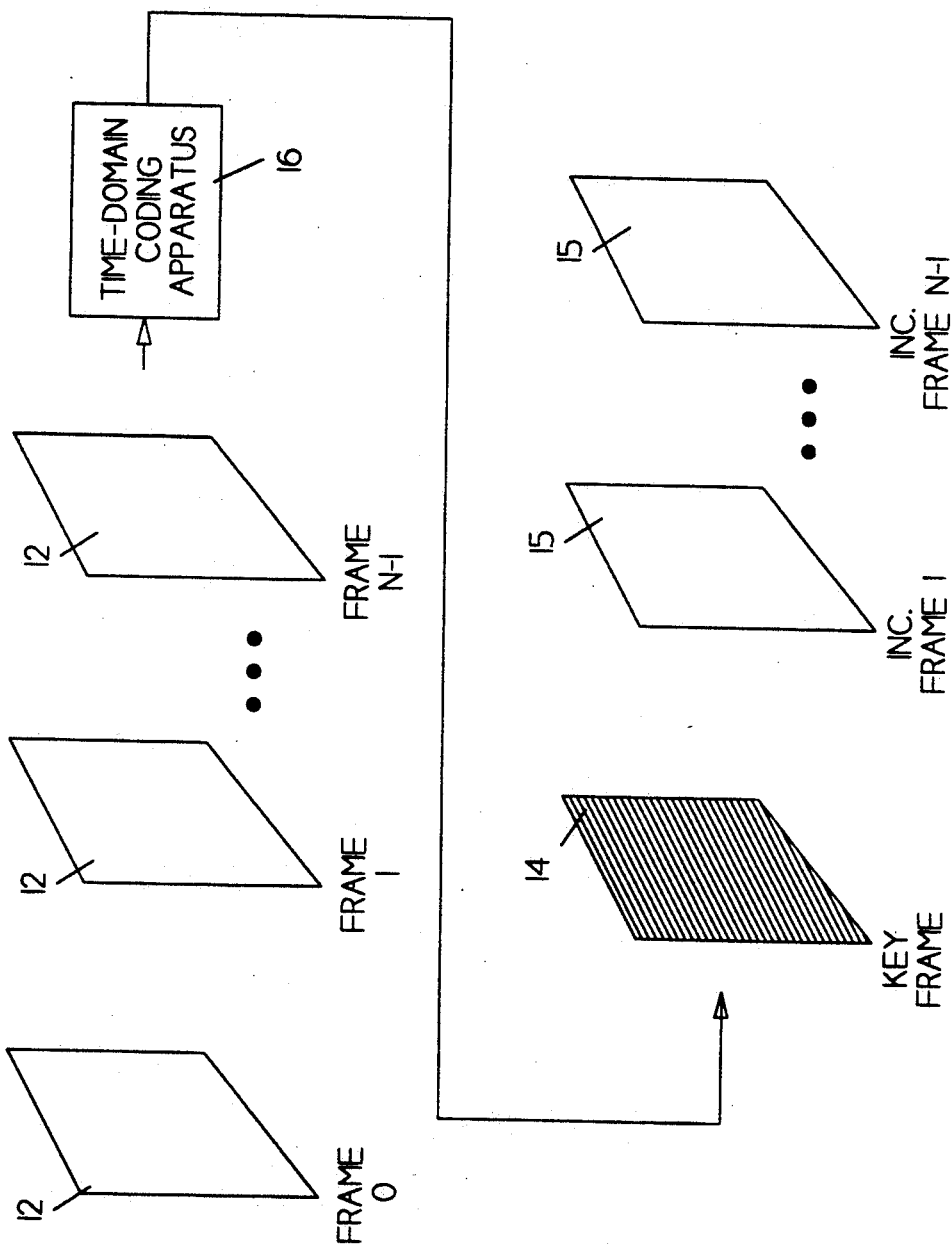
FIG. 1 illustrates a prior art method for coding a motion picture in the time domain.
Figure 2:
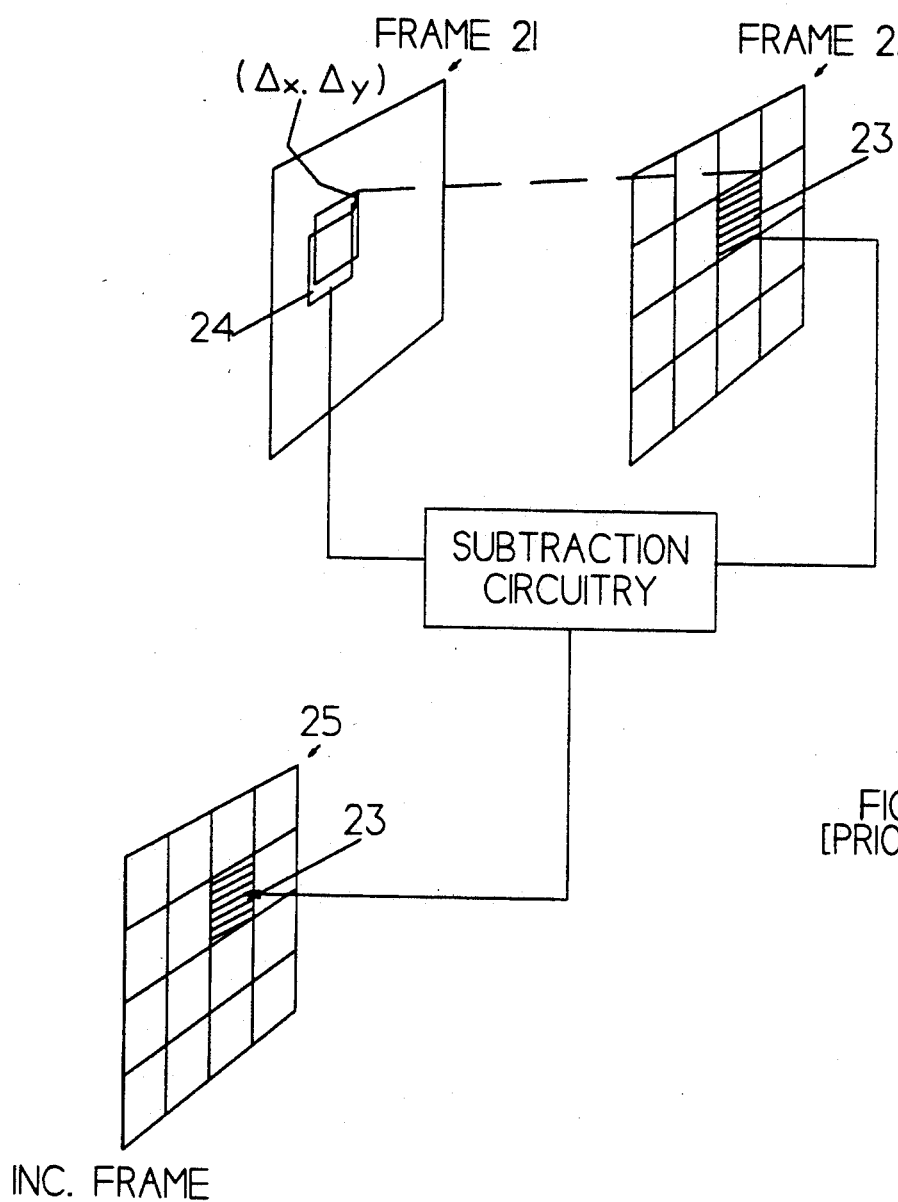
FIG. 2 illustrates a second prior art method for coding a motion picture in the time domain.

To simplify the following discussion, it will be assumed that a monochrome motion picture is to be coded. The manner in which the present invention may be extended to color motion pictures will be discussed in more detail below. The present invention may be most easily understood with reference to two prior art systems for coding the motion picture in the time domain. One prior art method for coding a motion picture in the time domain is illustrated in FIGS. 1-2. In this prior art scheme, a sequence of frames 12 from a motion picture is converted to a key frame 14 and one or more incremental frames 15 by a time domain coding apparatus 16. The key frame 14 is merely the first frame of the sequence. This frame is labeled frame 0 in FIG. 1. Each incremental frame is constructed by subtracting corresponding pixels in one of remaining frames from those in the frame 0. Thus, incremental frame 1 is constructed by subtracting frame 1 from frame 0, incremental frame 2 by subtracting frame 2 from frame 0, and so on.

In an image compression system the coded frames are approximated by frames in which the pixel intensity values are replaced by integers of a predetermined number of bits. It is this approximation that actually produces the reduction in the number of bits needed to represent the frames. This process is often referred to as quantization. Quantization methods are well known to those in the image compression arts, and hence, will not be discussed in detail here. For the purposes of this discussion, it is sufficient to note that the number of bits per pixel value needed to represent the pixel values to a predetermined accuracy depends on the statistical distribution of the pixel values in each frame. In general, there is a monotonic relationship between the variance of the statistical distribution in question and the number of bits per pixel needed to represent the frame to a predetermined accuracy. The goal of a time-domain coding scheme for motion pictures is to transform the original frames into a new set of frames in which at least some of the frames have statistical distributions with reduced variances.

In the prior art scheme discussed with reference to FIG. 1 above, the statistical distribution of the pixel values in the incremental frames is less than that in the original frames. This reduced variance allows the incremental frames to be coded in fewer bits than the original frames. The key frame still requires the same number of bits for its coding.

In general, the variance of the incremental frames will increase with the distance between the key frame and the frame from which the incremental frame was constructed. That is, the variance of the pixel distribution in incremental frame i is expected to be greater than that in frame (i- 1). When the variance becomes too large to provide efficient coding, a new key frame is defined and the incremental frames are then computed with respect to this new key frame.

While the method illustrated in FIG. 1 provides some improvement over the case in which no time-domain processing is used, it does not take advantage of all of the redundancy between the successive frames of the motion picture. This may be most easily understood with respect to a sequence of frames from a motion picture in which the camera pans across a scene.

Consider two successive frames in a motion picture in which the camera is panning across the scene; however, all other aspects of the scene are constant. The pixels in the two frames will be denoted by $I(x,y,t_1)$ and $I(x,Y,t_2)$, respectively. Except in the region of the edges, $$I(x,y,t_2)=I(x+Dx,y+Dy,t_1) \qquad (1)$$

where Dx and Dy depend on the rate at which the camera is panning across the scene. Hence, if the second frame $I(x+Dx,y+Dy,t_2)$ were shifted by an amount $(-Dx,-Dy)$ the two frames would be identical, except at the edges. If this shift was made prior to transforming the frames in the time direction, the difference in the two resulting images would be much smaller than in the two original images. Hence, if the first frame is used to generate the key frame and the second frame is used to generate an incremental frame, the statistical distribution of the pixels in the resulting incremental frame will have a much lower variance. As a result, the number of bits needed to code the incremental frame is substantially reduced.

The technique described above can be generalized to provide advantages even in those cases in which the entire scene is not panned. Such schemes are often referred to as motion compensation schemes. Refer now to FIG. 2 which illustrates the manner in which this technique is generalized. Consider two successive frames 21 and 22 in a motion picture sequence. Again, the pixels of the two frames will be denoted by $I(x,y,t_1)$ and $I(x,Y,t_2)$, respectively. The second frame 22 is divided into a plurality of regions. Each region in the second frame is matched with a region in the first frame of the same size. For example, region 23 in frame 22 is matched with region 24 in frame 21. The matching is performed by picking the region in frame 21 which most nearly matches region 23 in frame 22. That is, the region for which the error function $E(Dx,Dy)$ $$E(Dx,Dy) = \sum_x \sum_y [I(x,y,t_1) - I(x + Dx,y + Dy,t_2)]^2 \qquad (2)$$

is minimized. The search is carried out for all values of (Dx,Dy) in some predetermined range relative to (x,y). The region in question may be specified by its offset (Dx,Dy) relative to the location in frame 21 that block 23 would have been matched against in the system described above with reference to FIG. 1.

Once each region in frame 22 is matched to a corresponding region in frame 21, the corresponding regions are subtracted to form an incremental frame 25. The incremental frame is then coded together with the offsets corresponding to each region.

While this improved prior art method provides significantly better compression than the method described with reference to FIG. 1, the degree of compression obtained is still insufficient for many applications.

Figure 3:
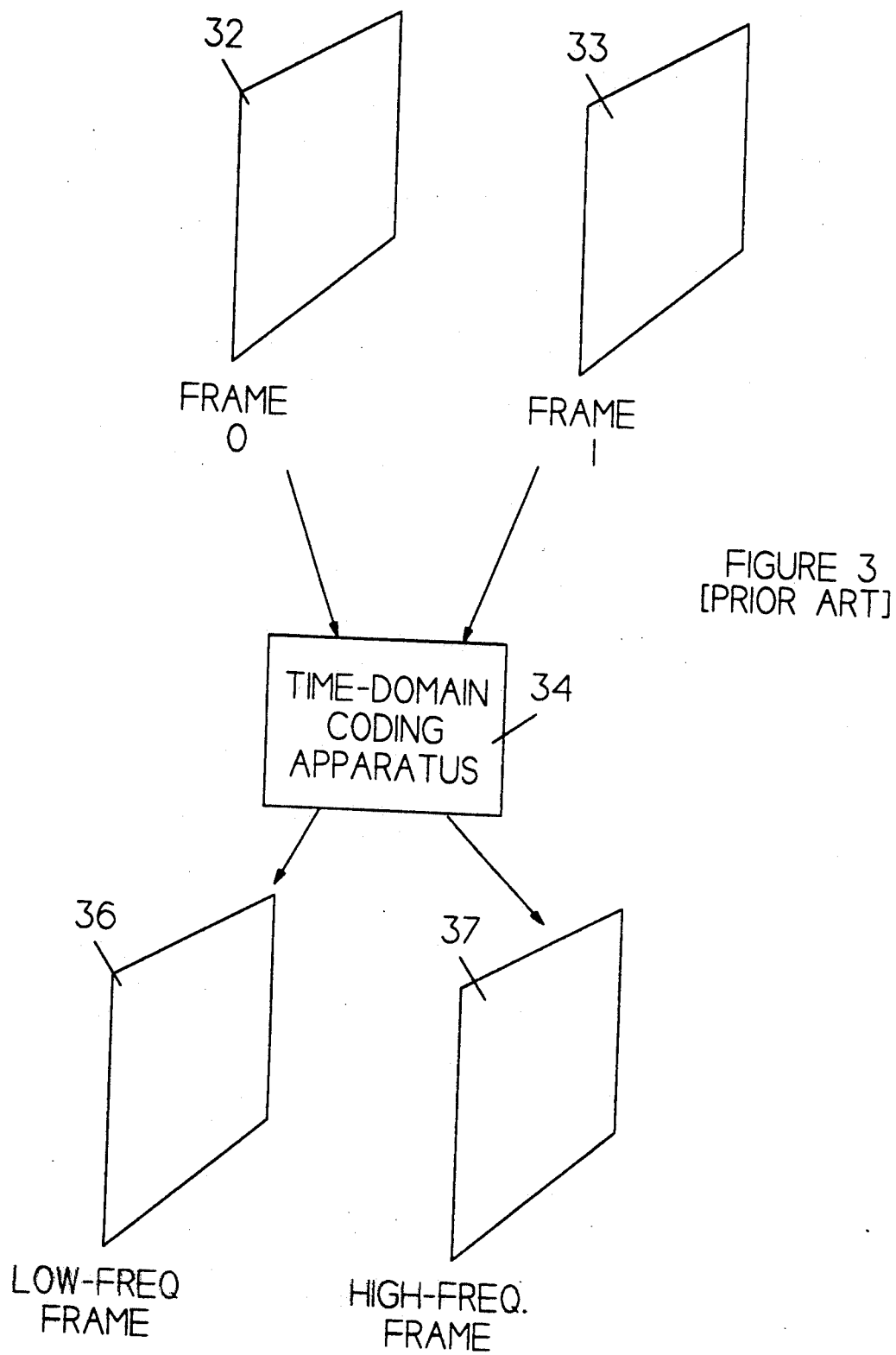
FIG. 3 illustrates a third prior art method for coding a motion picture in the time domain.

A second prior art method that has met with some success in coding signals and still images is referred to as sub-band coding. FIG. 3 illustrates the manner in which the simplest of these coding schemes is applied to generate frames that are analogous to the key and incremental frames described above. Referring to FIG. 3, two frames 32 and 33 from a motion picture sequence are combined by a coding apparatus 34 to generate a low-frequency frame and a high-frequency frame. The low-frequency frame is analogous to the key frame described above, and the high-frequency frame is analogous to one of the incremental frames described above. The pixels of the low-frequency frame $L(x,y)$ are related to those of frames 32 and 33 by $$L(x,y)=[I(x,Y,t_1)+I(x,Y,t_2)]/M \qquad (3)$$

where $I(x,y,t_1)$ are the pixels of frame 32 and $I(x,y,t_2)$ denote the pixels of frame 33. The constant M depends upon the particular version of the subband coding transform that is being used. Similarly, the pixels of the high-frequency frame $H(x,y)$ are related to those of frames 32 and 33 by $$H(x,y)=[I(x,y,t_1)-I(x,Y,t_2)]/M \qquad (4)$$

Since the pixels of the low-frequency frame are essentially the average of the corresponding pixels in the two frames from which it was generated, the variance of the pixel intensity distribution in the low-frequency frame will, in general, be less than that in either of the original frames. Hence, the low-frequency frame may be coded with fewer bits than the analogous key frame described with reference to FIG. 1. The pixels of the high-frequency frame are proportional to those of the incremental frame described with reference to FIG. 1; hence, the coding of the incremental frame requires the same number of bits. As a result, a net savings is realized relative to the system described with reference to FIG. 1.

While the system described with reference to FIG. 3 provides an improvement over the system described with reference to FIG. 1, it does not take advantage of the types of redundancy associated with panning or other forms of motion. The present invention provides a compression method which provides the advantages associated with sub-band coding in addition to those associated with motion compensation.

Figure 4:
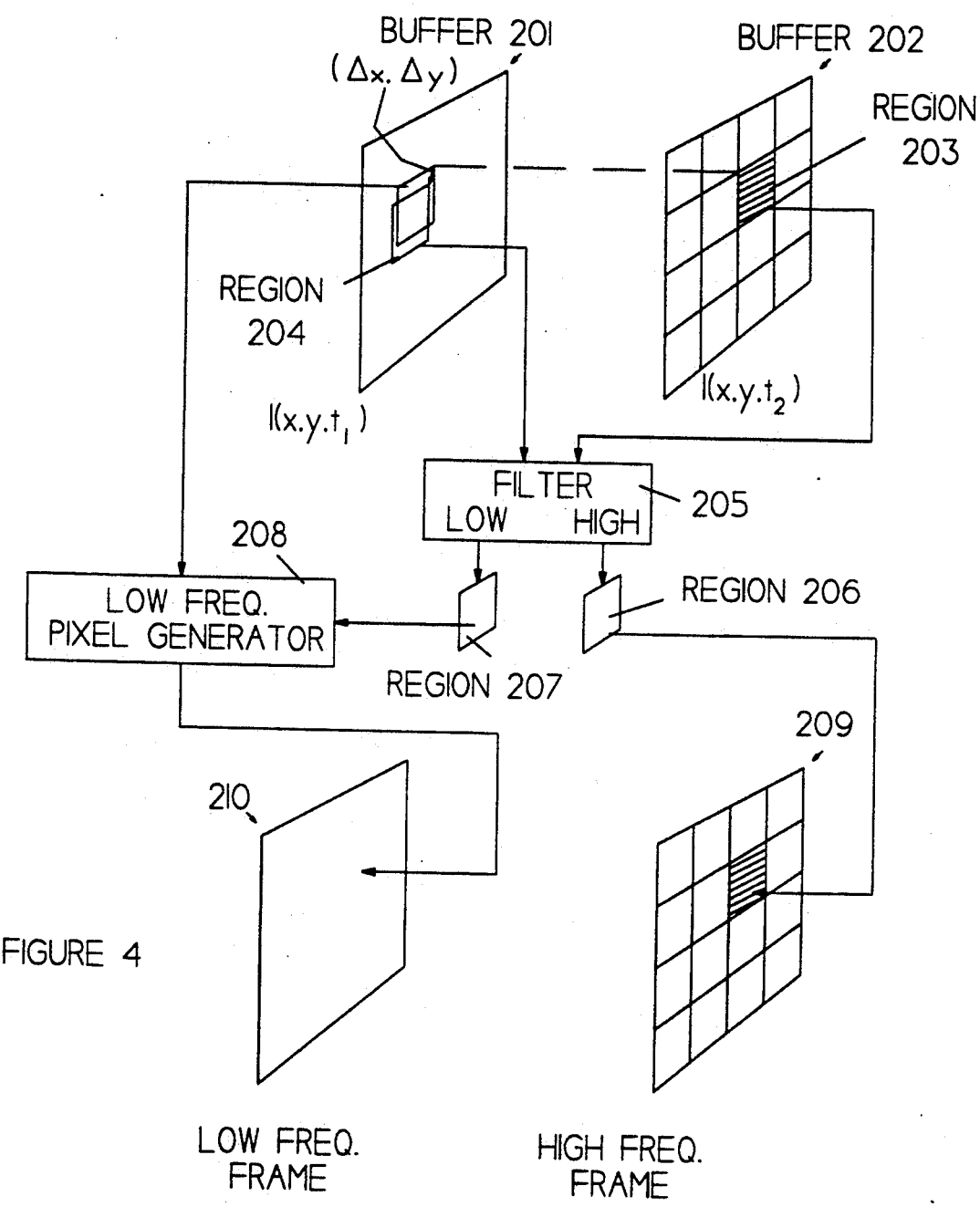
FIG. 4 is a block diagram of an apparatus according to the present invention for coding a motion picture in the time domain.

Refer now to FIG. 4 which illustrates the manner in which the preferred embodiment of the present invention operates. Consider two successive frames $I(x,y,t_1)$ and $I(x,Y,t_2)$ in a motion picture sequence. The received frames are stored in frame buffers 201 and 202 on receipt thereof by an apparatus according to the present invention. The frame buffers are preferably constructed from conventional computer memory chips. The second frame 202 is divided into a plurality of regions. Each region in the second frame is matched with a region in the first frame of the same size in a manner similar to that described with reference to FIG. 2. For example, region 203 in frame 202 is matched with region 204 in frame 201. The matching is performed by picking the region in frame 201 which most nearly matches region 203 in frame 202. That is, the region for which the error function $E(Dx,Dy)$ described above is minimized. The region in question may be specified by its offset (Dx,Dy) relative to the location in frame 201 that block 203 would have been stored had the frame been stored in frame buffer 201. The unshifted location corresponding to region 204 is shown at 214. This matching operation is preferably carried out by low-frequency pixel generator 208. In the preferred embodiment of the present invention, low-frequency pixel generator 208 is implemented on a general purpose data processing system.

Once each region in frame buffer 202 is matched to a corresponding region in frame buffer 201, the corresponding regions are combined to generate the pixels of a high-frequency frame having pixels $H(x,y)$ stored in a frame buffer 209 and a low-frequency frame having pixels L(x,y) stored in a frame buffer 210. Initially, each pixel in the low-frequency frame is initialized to the value of the corresponding pixel in frame buffer 201 multiplied by an appropriate normalization factor F, i.e., $L(x,y)=F*I(x,y,t_1)$. The reason for the normalization factor will be discussed in more detail below. The number of times each pixel in frame 201 was matched to a pixel in frame 202 is also determined, and this information is stored in low-frequency pixel generator 208 whose function will be described in detail below. The offsets determined for each region in frame buffer 202 are saved in low-frequency pixel generator 208 and sent with the final compressed images, since this information is needed to decode the frames.

Once the above-described initialization has been completed, the various regions in frame buffer 202 are combined using a filter 205 which generates a high-frequency region 206 and a low-frequency region 207 from the corresponding regions in frames 201 and 202. In the preferred embodiment of the present invention, a two-point Haar filter is used; however, embodiments using filters requiring more time domain data points will be apparent to those skilled in the art. Filter 205 is preferably constructed from two finite impulse response (FIR) filters. The FIR filters may be constructed from special purpose signal processing chips or may implemented on a general purpose data processing system.

The manner in which the filter is used may be most easily understood with reference to exemplary regions 203 and 204. For each pixel in region 203 the corresponding pixel in region 204 is selected. The pixel in region 204 corresponding to $I(x,y,t_2)$ in region 203 will be denoted by $I(x+Dx,y+Dy,t_1)$, where (Dx,Dy) is the offset corresponding to region 203. Each pair of pixels are combined by filter 205 to generate two pixels, PL and PH, where $$p_L = (I(x,Y,t_2) + I(x+Dx,y+Dy,t_1))/M \quad (5)$$

$$p_H = (I(x,Y,t_2) - I(x+Dx,y+Dy,t_1))/M \quad (6)$$

Here, M is a normalization factor which depends on the particular filter and inverse filter implementation. In the preferred embodiment of the present invention, $M^2=2$; however, it will be apparent to those skilled in the art that other normalizations may be utilized. The control of filter 205 may be provided by a separate controller that determines which pixels are input to filter 205. Alternatively, the low-frequency pixel generator 208 may provide this function, since it already includes the necessary general purpose data processing functions needed to accomplish this control task.

The high-frequency pixel is stored at the corresponding location in the high-frequency frame buffer 209, i.e., $H(x,y)=p_H$. The pixel stored in the low-frequency frame buffer 210 at the corresponding location, i.e., $L(x+Dx,y+Dy)$ depends on the number of times $I(x+Dx,y+Dy,t_1)$ was matched to a pixel in frame buffer 202. If $I(x+Dx,y+Dy,t_1)$ was matched precisely once, then $L(x+Dx,y+Dy)$ is set to $p_L$. If the pixel was matched more than once or not at all, the initialization value is used. Since the offsets used in transforming the two frames are coded and sent to the decoding apparatus with the information specifying the two frames, the decoding apparatus can determine which pixels in the low-frequency image correspond to filter values and which pixels correspond to the original pixels in frame buffer 201. This provides sufficient information for the decoding apparatus to reconstruct the two frames.

It should be noted that one cannot merely replicate the strategy described with reference to the prior art motion compensation schemes in the sub-coding methods. That is, one cannot set the pixels of the low-frequency frame to the $p_L$ values no matter how many times each pixel in the first frame was matched to a pixel in the second frame. Consider a pixel in the first frame which is never matched to a pixel in the second frame. If the low-frequency pixels were always set to $p_L$, this pixel value would be undefined. If a zero were stored for this pixel, then one of the pixels in the first frame would be lost. Similarly, if the pixel in the first frame had been matched a number of times to a pixel in the second frame, then there would be several $p_L$ values that would need to be stored, but only one location for storing the different values. The method of the present invention provides a solution to these problems while maintaining the benefits of the sub-band coding system over most of the frames.

While the above described embodiment of the present invention has been discussed in terms of separate components for the various buffers, filters, and controlling elements, it will be apparent to those skilled in the art that a coding apparatus according to the present invention may be implemented by programming a general purpose computing system to carry out the operations described above.

Figure 5:
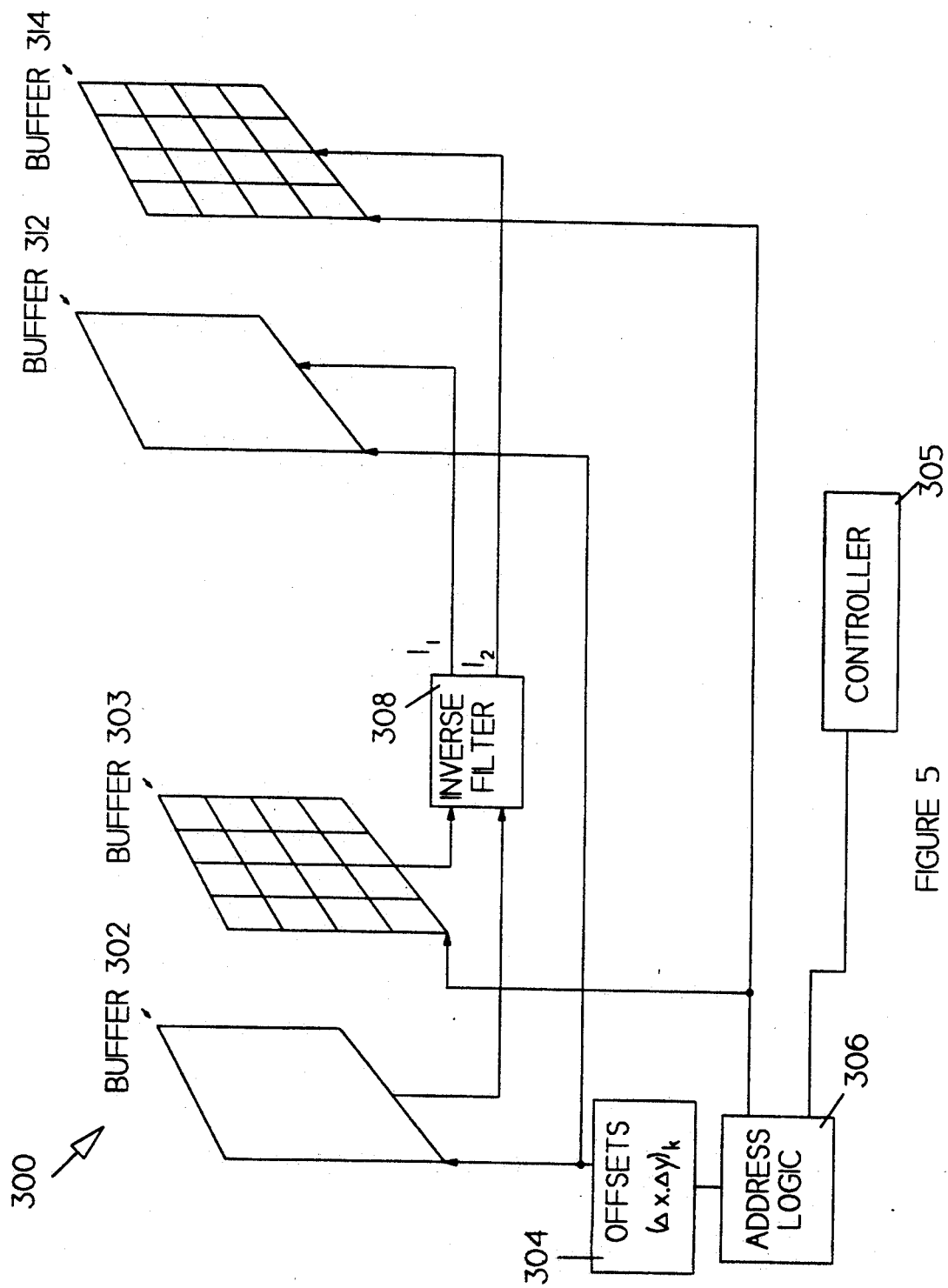
FIG. 5 is a block diagram of an apparatus according to the present invention for decoding a motion picture that has been coded by the apparatus shown in FIG. 4.

The preferred embodiment of an apparatus for decoding an image compressed by the apparatus discussed with reference to FIG. 4 is shown in FIG. 5 at 300. Decoding apparatus 300 receives a low-frequency frame L(x,y) which is stored in a frame buffer 302, a high-frequency frame H(x,y) which is stored in a frame buffer 303, and a set of offsets $(Dx,Dy)_k$ which are stored in a third buffer 304. The frame buffers are preferably constructed from conventional computer memory chips. The offset $(Dx,Dy)_k$ specifies the offset for the $k^{th}$ region of frame buffer 303 at which the corresponding pixels in frame buffer 302 are stored. Controller 305 is assumed to already have information specifying the boundaries of the various regions.

The frame reconstruction at the decoding apparatus is carried out as follows. The decoding apparatus receives information specifying L(x,y) and H(x,y) and the offsets for each of the blocks in H(x,y). The value stored in buffer 312 at location (x,y) will be denoted by $I_1(x,y)$ in the following discussion. Similarly the value stored in buffer 314 at location (x,y) will be denoted by $I_2(x,y)$. Frame buffer 312 is initialized by dividing each entry in frame buffer 302 by the factor F discussed above and then storing the resultant value at the corresponding location in buffer 312. That is, $I_1(x,y)$ is initially set equal to $L(x,y)/F$.

For each location (x,y) in frame buffer 303, controller 305 determines which of the original regions the point lies in and extracts the corresponding offset (Dx,Dy) from buffer 304. Controller 304 then uses the offsets to determine how many times (x+Dx,y+Dy) in buffer 302 was matched to a location in buffer 303 in the original time domain coding. If the point was matched precisely once, controller 305 uses the output of inverse filter 308 to determine two pixel values, 11 and 12 which are then stored at locations (x+Dx,y+Dy) and (x,y) in output frame buffers 312 and 314 respectively. Inverse filter 308 solves Eqs. (5) and (6) for $I(x,Y,t_2)$ and $I(x+Dx,y+Dy,t_1)$. Namely, Namely, $$I_1(x + Dx, y + Dy) = [L(x + Dx, y + Dy) - H(x,y)]\frac{M}{2} \quad (7)$$

$$I_2(x,y) = [L(x + Dx, y + Dy) + H(x,y)]\frac{M}{2} \quad (8)$$

If the pixel at (x+Dx, y+Dy) in buffer 302 was matched more than once, controller 305 computes only one pixel value, $I_2$ stored at location (x,y) in output buffer 314 using the output of a modified inverse filter. Namely, $$I_2(x,y) = L(x+Dx, y+Dy)/F + M * H(x,y) \quad (9)$$

In general, inverse filter 308 is determined by the filter used in compressing the frames received by apparatus 300. Filter 308 is preferably constructed from digital data processing elements such as special purpose signal processing chips used to implement FIR filters; however, it will be apparent to those skilled in the art that general purpose data processing systems may also provide this function. Controller 305 is preferably constructed from a general purpose data processing system that has been programmed to carry out the above described operations.

While the above described embodiment of a reconstruction apparatus according to the present invention has been discussed in terms of separate components for the various buffers, filters, and controlling elements, it will be apparent to those skilled in the art that a coding apparatus according to the present invention may be implemented by programming a general purpose computing system to carry out the operations described above.

While the above-described embodiment of a reconstruction apparatus according to the present invention includes four buffers, two for storing the low and high-frequency frames and two for storing the output frames, it will be apparent to those skilled in the art that the low-frequency frame buffer can also be used as one of the output frame buffers. In this case, the contents of the low-frequency frame buffer are divided by F during the initialization process. The inverse filter is then adjusted to take this change into account when calculating the pixels of the second frame and those of the first frame that depend on the pixels of the high-frequency frame.

As noted above, when a location in the first frame is used more than once or not at all, the value of the pixel in the first frame buffer at that location is stored multiplied by normalization factor F. It will be apparent from the above discussion that the reconstruction apparatus' ability to recover the two original frames does not depend on the value of F, provided F is non-zero. The value of F does, however, affect the ability of the frame coding apparatus to compress the low-frequency frame generated by the present invention.

The low-frequency frame may be considered to be the union of two frames, the first having pixels equal to those of the original first frame of the two frame sequence, and the second having pixels generated by the low-pass filter in the filter bank. The low-frequency frame will contain "boundaries" separating pixels selected from these two component frames. These boundaries introduce high spatial frequency information into the low-frequency frame. In the absence of further coding of the low-frequency frame in the spatial coordinates (x,y), these boundaries would have no effect. However, in the preferred embodiment of a motion picture compression system utilizing the present invention, the low-frequency and high-frequency frames are further coded using sub-band coding techniques. Such high-frequency spatial information limits the ability of the spatial coder to compress the individual frames. The purpose of the normalization factor F is to minimize the high-spatial frequency information introduced by such boundaries. This will occur if the value stored is equal to the value outputted by the filter when both input pixel values have the same value as the pixel value in the first frame. This corresponds to F=2/M. This choice corresponds to the low-frequency filter output that would have been obtained if the filter bank had been applied to two pixel values of the same intensity as the first frame pixel at the location in question.

The embodiments of the present invention described with reference to FIGS. (4) and (5) above generate a low-frequency frame and a high-frequency frame from each pair of frames in the motion picture. Hence, a compression system based on this scheme provides at most a compression factor of two in the absence of further coding. Higher compression factors may be obtained by iteratively applying the technique described above on the low-frequency frames. FIG. 6 illustrates the manner in which the present invention may be applied to four successive frames in the motion picture sequence to generate a low-frequency frame and three high-frequency frames. The four frames in question are shown at 402-405. A first time domain coding apparatus 41 0 according to the present invention generates a low-frequency frame 412 and a high-frequency frame 413 from frames 402 and 403. A second time domain coding apparatus 411 generates a low-frequency frame 414 and a high-frequency frame 415 from frames 404 and 405. Finally, time domain coding apparatus 420 generates a low-frequency frame 421 and a high-frequency frame 422 from frames 412 and 414. Frames 421, 422, 413, and 415 are then coded for transmission. This embodiment of the present invention will provide a compression ratio as high as four. It will be apparent to those skilled in the art, that higher ratios can be obtained by repeating the process on longer sequences of frames. The various coding apparatuses may be constructed from individual data processing systems or all of these apparatuses may be implemented on a single data processing system.

The above-described embodiments of the present invention assumed a mono-chrome motion picture. However, it will be apparent to those skilled in the art that the same method and apparatus can be utilized with color motion pictures. In general, a color motion picture may be decomposed into a plurality of mono-chrome motion pictures representing the pixel intensities in each of the primary colors or some other chromatic coding system. The present invention can then be applied to each of these monochrome pictures.

The above-described embodiments of the present invention utilized a particularly simple filter bank for generating the high and low-frequency images from a sequence of frames from the motion picture. It will be apparent to those skilled in the art that more complex filters can, in principle, be used. The filter described above is preferred because it requires that only two frames be stored and that one set of offsets be calculated. Filter banks that operate on higher numbers of points are known to the prior art. The filter bank is typically implemented as two digital finite impulse response filters (FIR). The filter bank accepts a vector having M components, x(i). If M is not even, a zero is appended to x to force M to be even. The filter bank multiplies the elements of x with the elements of a vector having components a(k), where k runs from 0 to N-1, to form two vectors having components, $y_L(i)$ and $y_H(i)$. These vectors each have M/2 such elements. The components of $y_L(i)$ and $y_H(i)$ are calculated as follows:

$$y_L(2m) = \sum_{k=0}^{N-1} a(k)x(2m - N + k) \quad (10)$$

$$y_H(2m + 1) = \sum_{k=0}^{N-1} a(k)(-1)^{k+1}x(2m + 1 - k) \quad (11)$$

$$y_L(2m) = \sum_{k=0}^{N-1} a(k)x(2m - N + k) \quad (10)$$

$$y_H(2m + 1) = \sum_{k=0}^{N-1} a(k)(-1)^{k+1}x(2m + 1 - k) \quad (11)$$

Here, m runs from 0 to (M/2)−1.

Since the filter bank requires M points, the information in M successive frames is combined to form the high and low-frequency frames. This requires that M-1 sets of offsets be computed and transmitted together with the pixels of the high and low-frequency frames. This adds a significant computational load to the system. However, there may be specific motion picture sequences for which the proper choice of a(k) leads to significantly higher compression ratios than those obtained by iteratively applying the M=2 filter described with reference to the preferred embodiments of the present invention.

There has been described herein a novel apparatus and method for compressing and decompressing motion pictures. Various modifications to the present invention will become apparent to those skilled in the art from the foregoing description and accompanying drawings. Accordingly, the present invention is to be limited solely by the scope of the following claims.

What is claimed is:

1. An apparatus for generating high and low-frequency component images from first and second input frames of a motion picture, said apparatus comprising:

first and second buffer means for storing first and second input arrays of pixel values respectively, said first array representing the intensity values in said first input frame and said second input array representing the intensity values in said second frame, said second input array being divided into a plurality of regions, each region storing a contiguous block of pixel values;

means for matching each said region in said second input array with a region of the same size in said first input array thereby defining a pixel in said first input array corresponding to each said pixel in said second input array;

means for assigning one of two values to each pixel value in said first input array, said first value being assigned if said pixel was included in a region matched to one and only one of said regions in said second input array by said matching means, and otherwise to said second value;

low-frequency buffer means for storing an array of pixel values representing the intensity values of said low-frequency component image, said low-frequency buffer means including one location corresponding to each said pixel value in said first input array;

high-frequency buffer means for storing an array of pixel values representing the intensity values of said high-frequency component image, said high-frequency buffer means including one location corresponding to each said pixel value in said second input array;

frame initialization means for causing said low-frequency buffer means to initially store a value related to the pixel value stored in said first input array at each location corresponding to a pixel in said first input array that was assigned said second value; and filter means for combining each pixel in said second input array with said corresponding pixel in said first input array to generate high and low-frequency pixels, said high-frequency pixel being stored in said high-frequency buffer means in said location corresponding to said pixel in said second input array and said low-frequency pixel being stored in said low-frequency buffer means in said location corresponding to said pixel in said first input array if said assigning means assigned said first value to said corresponding pixel in said first input array.

2. The apparatus of claim 1 wherein each said initially stored values is equal to the low-frequency pixel that would have been generated by said filter means if said pixel value in said second input array were the same as said pixel value in said first input array.

3. An apparatus for generating first and second frames of a motion picture from a high-frequency image and a low-frequency image, said apparatus comprising:

high-frequency buffer means for storing a two-dimensional array of pixel values representing said high-frequency image;

low-frequency buffer means for storing a two-dimensional array of pixel values representing said low-frequency image;

means for storing information specifying a correspondence between each pixel value stored in said high-frequency buffer means and a pixel value stored in said low-frequency buffer means;

means for assigning a state to each pixel value in said low-frequency buffer means, said state having one of two values, said state being set to said first value if said pixel value in said low-frequency buffer means is specified as corresponding to a pixel in said high-frequency buffer one and only one time, and otherwise to said second value;

first generating means for generating a pixel in said first frame from said pixel value stored in said low-frequency buffer at a location depending on said pixel if said assigning means assigned said second value to said pixel value stored in said low-frequency buffer means;

second generating means for generating a pixel value in said first frame from a pixel value in said high-frequency frame at a location depending on said pixel and said corresponding pixel in said low-frequency frame when said assigning means assigns said first value to said pixel in said low-frequency frame; and third generating means for generating a pixel in said second frame from each pair of corresponding pixels in said low-frequency buffer means and said high-frequency buffer means.

4. A method for generating high and low-frequency component images from first and second frames of a motion picture, said method comprising:

storing first and second input arrays of pixel values respectively, said first array representing the intensity values in said first input frame and said second input array representing the intensity values in said second frame, said second input array being divided into a plurality of regions, each region storing a contiguous block of pixel values;

matching each said region in said second input array with a region of the same size in said first input array thereby defining a pixel in said first input array corresponding to each said pixel in said second input array;

assigning one of two values to each pixel value in said first input array, said first value being assigned if said pixel was included in a region matched to one and only one of said regions in said second input array by said matching means, and otherwise to said second value;

storing an array of pixel values representing the intensity values of said low-frequency component image in a low-frequency buffer, said low-frequency buffer including one location corresponding to each said pixel value in said first input array;

storing an array of pixel values representing the intensity values of said high-frequency component image in a high-frequency buffer, said high-frequency buffer including one location corresponding to each said pixel value in said second input array;

causing said low-frequency buffer to initially store a value related to the pixel value stored in said first input array at each location corresponding to a pixel in said first input array that was assigned said second value; and combining each pixel in said second input array with said corresponding pixel in said first input array to generate high and low-frequency pixels, said high-frequency pixel being stored in said high-frequency buffer in said location corresponding to said pixel in said second input array and said low-frequency pixel being stored in said low-frequency buffer in said location corresponding to said pixel in said first input array if said assigning means assigned said first value to said corresponding pixel in said first input array.

5. The method of claim 4 wherein each said initially stored values is equal to the low-frequency pixel that would have been generated by said filter means if said pixel value in said second input array were the same as said pixel value in said first input array.

6. A method for generating first and second frames of a motion picture from a high-frequency image and a low-frequency image, said method comprising:

storing a two-dimensional array of pixel values representing said high-frequency image in a high-frequency buffer;

storing a two-dimensional array of pixel values representing said low-frequency image in a low-frequency buffer;

storing information specifying a correspondence between each pixel value stored in said high-frequency buffer and a pixel value stored in said low-frequency buffer;

assigning a state to each pixel value in said low-frequency buffer, said state having one of two values, said state being set to said first value if said pixel value in said low-frequency buffer is specified as corresponding to a pixel in said high-frequency buffer one and only one time, and otherwise to said second value;

generating a pixel in said first frame from said pixel value stored in said low-frequency buffer at a location depending on said pixel if said assigning means assigned said second value to said pixel value stored in said low-frequency buffer means;

generating a pixel value in said first frame from a pixel value in said high-frequency frame at a location depending on said pixel and said corresponding pixel in said low-frequency frame when said assigning means assigns said first value to said pixel in said low-frequency frame; and generating a pixel in said second frame from each pair of corresponding pixels in said low-frequency buffer and said high-frequency buffer.

* * * * *

UNITED STATES PATENT AND TRADEMARK OFFICE
CERTIFICATE OF CORRECTION

PATENT NO. : 5,301,020

DATED : April 5, 1994

INVENTOR(S) : Philippe M. Cassereau

It is certified that error appears in the above-identified patent and that said Letters Patent is hereby corrected as shown below:

Column 1, line 41, delete "frill" and insert therefor --full--.

Column 3, line 43, delete ".%hat" and insert therefor --that--.

Column 4, line 22, after "in" delete "the".

Column 5, line 4, delete "I(x,Y,$t_2$)" and insert therefor --I(x,y,$t_2$)--.

Column 5, line 50, delete "2 1" and insert therefor --21--.

Column 6, line 5, delete "I(x,Y,$t_2$)]" and insert therefor --I(x,y,$t_2$)]--.

Column 6, line 14, delete "I(x,Y,$t_2$)]" and insert therefor --I(x,y,$t_2$)]--.

Column 7, line 38, delete "(I(x,Y,$t_2$)" and insert therefor --(I(x,y,$t_2$)--.

Column 7, line 40, delete "(I(x,Y,$t_2$)" and insert therefor --(I(x,y,$t_2$)--.

Column 8, line 64, delete "11 and 12" and insert therefor --$I_1$ and $I_2$--.

Column 8, line 67, delete "I(x,Y,$t_2$)" and insert therefor --I(x,y,$t_2$)--.

Column 8, line 68, delete second occurrence of "Namely,".

Column 11, lines 20-22, delete second occurrence of Eqs. (10) & (11).

Column 4, line 21, after "of" insert --the--.

UNITED STATES PATENT AND TRADEMARK OFFICE
CERTIFICATE OF CORRECTION

PATENT NO. : 5,301,020
DATED : April 5, 1994
INVENTOR(S) : Philippe M. Cassereau It is certified that error appears in the above-indentified patent and that said Letters Patent is hereby corrected as shown below:

Column 7, line 26, after "may" insert --be--.

Signed and Sealed this

Sixth Day of September, 1994

Attest:

BRUCE LEHMAN

*Attesting Officer*    *Commissioner of Patents and Trademarks*